(12) United States Patent
Chevalier et al.

(10) Patent No.: US 8,907,235 B2
(45) Date of Patent: Dec. 9, 2014

(54) HORN CONTACT ARRANGEMENT IN COOPERATION WITH AN AIRBAG MODULE

(75) Inventors: Nicolas Chevalier, Victoria (AU); Jean Kuriakose Valakkatti, Victoria (AU); Jonas Nordqvist, Victoria (AU)

(73) Assignee: Autoliv Development AB, Värgärda (SE)

( * ) Notice: Subject to any disclaimer, the term of this patent is extended or adjusted under 35 U.S.C. 154(b) by 194 days.

(21) Appl. No.: 13/578,311

(22) PCT Filed: Feb. 7, 2011

(86) PCT No.: PCT/EP2011/000547
§ 371 (c)(1),
(2), (4) Date: Aug. 10, 2012

(87) PCT Pub. No.: WO2011/098238
PCT Pub. Date: Aug. 18, 2011

(65) Prior Publication Data
US 2012/0305371 A1    Dec. 6, 2012

(30) Foreign Application Priority Data
Feb. 10, 2010    (DE) .................. 10 2010 007 569

(51) Int. Cl.
*H01H 9/00* (2006.01)
*B60R 21/203* (2006.01)
*B60Q 5/00* (2006.01)

(52) U.S. Cl.
CPC ............ *B60R 21/2037* (2013.01); *B60Q 5/003* (2013.01)
USPC ................................... 200/61.54; 280/728.2

(58) Field of Classification Search
USPC .............. 200/61.54, 61.55, 61.56; 280/728.2, 280/731
See application file for complete search history.

(56) References Cited

U.S. PATENT DOCUMENTS

| | | |
|---|---|---|
| 7,159,897 B2 * | 1/2007 | Worrell et al. ................ 280/731 |
| 7,264,266 B2 | 9/2007 | Erlingstam et al. |
| 7,547,042 B2 | 6/2009 | Chapelain et al. |
| 7,708,309 B2 | 5/2010 | Kim et al. |

(Continued)

FOREIGN PATENT DOCUMENTS

| | | |
|---|---|---|
| DE | 600 15 245 T2 | 2/2006 |
| DE | 10 2005 002 945 A1 | 7/2006 |

(Continued)

OTHER PUBLICATIONS

PCT International Search Report—Oct. 2, 2010.

(Continued)

*Primary Examiner* — Vanessa Girardi
(74) *Attorney, Agent, or Firm* — Brinks, Gilson & Lione

(57) ABSTRACT

The invention relates to a safety device having an airbag module which has a housing (40) and which can be mounted in the steering wheel of a motor vehicle, having a cover (10) fastened to the housing (40) in a movable manner, on which a first horn contact (30) is arranged; at least a second horn contact (50) is arranged on the housing (40), which, in the initial position, is electrically isolated from the first horn contact (30), and in the activation position, comes into electrical contact with the first horn contact (30) in order to trigger a horn signal. The second horn contact (50) being configured as a separate component which is fixed to the housing (40) by at least one separate locking element (60).

9 Claims, 3 Drawing Sheets

(56) References Cited

U.S. PATENT DOCUMENTS

| | | | |
|---|---|---|---|
| 7,946,612 B2 * | 5/2011 | Chevalier et al. | 280/728.2 |
| 8,087,691 B2 | 1/2012 | Nebel et al. | |
| 2011/0101650 A1 | 5/2011 | Nebel et al. | |
| 2012/0126046 A1 | 5/2012 | Wulff | |

FOREIGN PATENT DOCUMENTS

| | | | |
|---|---|---|---|
| SE | WO 2008/007957 A1 | 7/2008 | |
| WO | 2006/019567 A2 | 2/2006 | |
| WO | WO 2006/019567 A1 | 2/2006 | |
| WO | WO2008079057 * | 3/2008 | ............ B60R 21/203 |
| WO | WO 2008/079057 A1 | 7/2008 | |

OTHER PUBLICATIONS

Examination Report—Dec. 23, 2010.

Chinese Examination Report—Jun. 5, 2014.

* cited by examiner

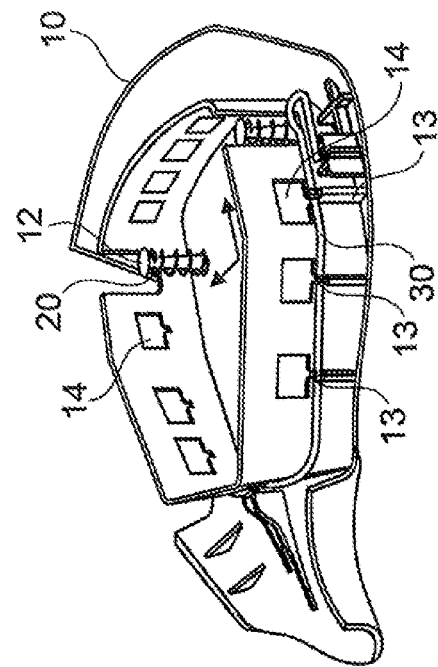
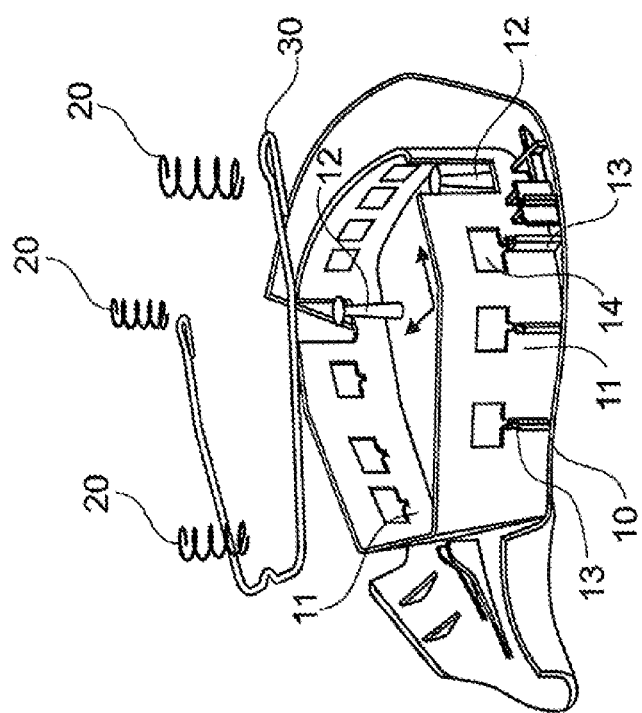

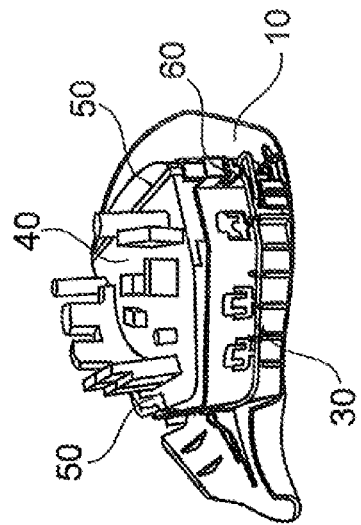
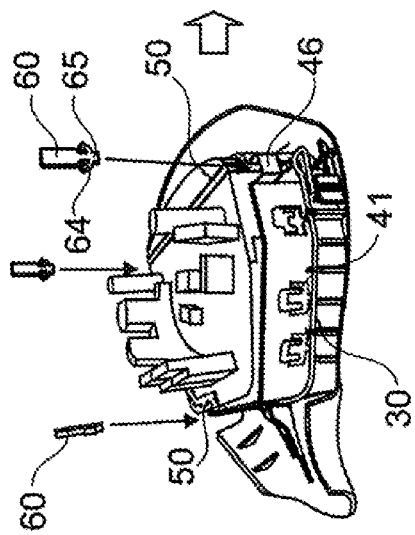
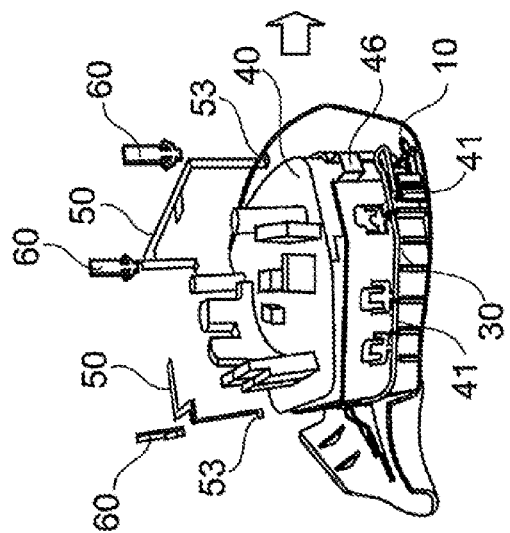

HORN CONTACT ARRANGEMENT IN COOPERATION WITH AN AIRBAG MODULE

CROSS-REFERENCE TO RELATED APPLICATIONS

This application claims priority to German Patent Application No. 10 2010 007 569.8, filed Feb. 10, 2010 and PCT/EP2011/000547, filed Feb. 7, 2011.

FIELD OF THE INVENTION

The invention relates to a safety device having an airbag module, which has a housing and can be mounted in the steering wheel of a motor vehicle having a cover which is fastened in a movable manner, on which a first horn contact is arranged. At least a second horn contact is arranged on the housing and, in an initial position, is isolated electrically from the first horn contact and, in an activation position, comes into electrical contact with the first horn contact in order to trigger a horn signal.

BACKGROUND OF THE INVENTION

WO 2008/079057 A1 relates to a safety device in the form of an airbag module which can be mounted to the steering wheel of a motor vehicle. The airbag module has a housing and a cover. The cover is mounted on the housing such that it can move. A wire is clipped onto the cover and configured to come into contact with contact parts, which are arranged on the housing, when the cover is displaced relative to the housing. The wire and the contacts work together as a contact arrangement that can be connected to an electrical circuit which controls the horn of the motor vehicle. If the cover is displaced in the direction of the housing, the wire comes into contact with the contact element and closes the electrical circuit. The contact element is an integral part of the housing which is configured from a metallic, electrically conductive material.

The object of the present invention is to provide a safety device which can be produced more easily and more cost-effectively.

According to the present invention, this object is attained by a safety device having the characteristics described and claimed herein.

The safety device according to the present invention has an airbag module which has a housing and can be mounted in the steering wheel of a motor vehicle, having a cover which is fastened to the housing in a movable manner, on which a first horn contact is arranged, at least a second horn contact is arranged on the housing which is isolated electrically from the first horn contact, and in an activation position, comes into contact with the first horn contact in order to trigger a horn signal. The invention provides that the second horn contact is configured as a separate component, which is fixed to the housing by at least one separate locking element. By configuring the second horn contact as a separate component, for example as a sheet metal component or as an electrically conductive molded part, it is possible to produce the housing from a plastic material, whereby the safety device is in general lighter and less expensive. The risk of faulty activation or electrical short circuits due to a metal housing is prevented. The electrical contact is only established at the contact points provided for that purpose.

The first horn contact can be configured as an electrically conductive wire which is fixed to the cover. The cover normally has a wall extending in the direction of the housing and facing away from the visible side, where the wire can preferentially be fixed to the external side of the wall. It can be clipped in or snapped in; other fastening methods are likewise possible. The wire can at least partially surround the wall of the cover, a resilient contact of the wire with the cover being preferably available.

The housing for accommodating the airbag as well as the gas generator can be made of a plastic material and preferentially completely consists of plastic, so that the housing can be easily and simply produced in a molding process, e.g. by means of injection molding.

The second horn contact can be configured as a conductive ribbon or as a conductive strip, for example made of sheet metal, metal fabric or the like. The locking element can at least have one resilient locking latch that fastens the locking element to the housing in a form fitting manner. The locking latch can engage in a recess or in a form fitting element of the housing, locking holders being configured at the housing which accommodate the locking element in a form fitting manner. The locking holders can for example be configured as frames into which the locking elements are inserted. After inserting the locking latch of the locking element through the locking holder, or through the frame, the resilient locking latch springs back to the initial position and form-fittingly locks the locking element on the locking holder.

The second horn contact can be guided through the locking holders and be fastened to the housing via the locking element. The locking element is preferentially made of plastic and has a front end against which the second horn contact abuts or rests. By supporting the second horn contact on the front end of the locking element facing the first contact of the locking element, the locking element of the second horn contact is not only fastened to the housing, but at the same time functions as a counter bearing and a bearing surface for the second horn contact in the region of the contact point between the first horn contact and the second horn contact. The contact point of the second horn contact is fixed relative to the first horn contact by the locking element so that no displacement of the second horn contact relative to the first horn contact can occur after establishing the electrical contact. Consequently the activation reliability of the horn signal is increased.

In the initial position, the first horn contact preferentially is not separated from the second horn contact by more than 3 mm in the direction of displacement of the cover (for horn actuation), so that only a short displacement path has to be covered relative to the housing in order to trigger a horn signal. By using a separate locking element, it is possible to adjust the contact distance almost arbitrarily without having to consider the requirements when locking and fastening the housing to the cover.

BRIEF DESCRIPTION OF THE DRAWINGS

An exemplary embodiment of the invention will be explained in more detail below with reference to the attached figures. The figures show:

FIG. 1 shows an inverted cover;
FIG. 2 shows a cover with a mounted first horn contact;
FIG. 3 shows a cover with the inserted housing;
FIG. 4 shows an embodiment according to FIG. 3 with a second horn contact in position;
FIG. 5 shows a fully mounted safety device.

DETAILED DESCRIPTION OF THE INVENTION

Figure 6:
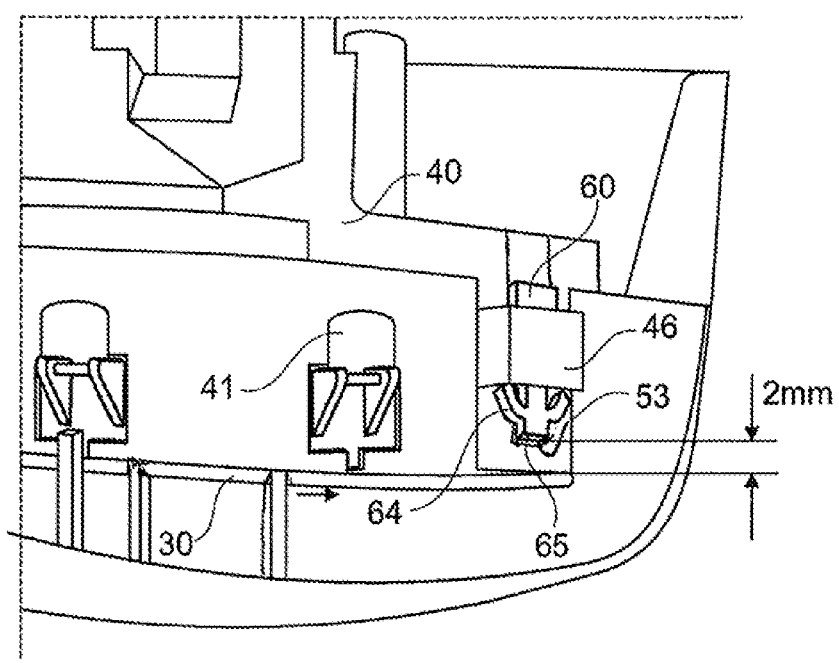
FIG. 6 shows a detailed view of the safety device.

FIG. 1 shows a cover 10 of a safety device, where the upper side of the cover 10 cannot be seen. Vertical walls 11 extend upward facing away from the visible side. An airbag module, which will be explained later, can be inserted in this wall 11. Pin-like projections 12 are likewise provided at the rear side of the cover 10 for holding and fixing coil springs 20. The coil springs 20 are stuck onto the projections 12 and can be fixed to grooves there. The springs 20 are used to press the cover 10 away from the housing.

A wire 30 having a U-shape, being basically planar in shape, can likewise be seen in FIG. 1. The wire 30 is used as a first horn contact and can be electrically connected to the circuit in which the horn is arranged via connectors or the like. The U-shaped wire 30 can be fastened to the wall 11 of the cover 10. Moreover, recesses 14 for locking elements of the housing are provided in the wall 11. The function of these recesses 14 will be explained later. The whole cover 10 can be made of plastic in one piece as an injection molded part. The springs 20 as well as the wire 30 are preferably made of metal; the wire 30 is electrically conductive.

In FIG. 2, the cover 10, the springs 20 and the wire 30 are joined together and configured as a modular part which is ready to hold the housing with the airbag. Supporting and holding devices 13 are provided at the housing wall 11 for the wire 30 as shown in FIGS. 1 and 2. In FIG. 2, wire 30 is placed in these supporting devices and holding devices 13 and clipped in, so that it cannot be displaced along the wall 11 in the displacement direction of the cover 10, which essentially corresponds to the length of the pin-like holders 12. In the mounted position, the wire 30 abuts firmly locked against the wall 11.

FIG. 3 shows a housing 40 made of plastic already inserted in the cavity of the rear side of the cover 10 formed by the wall 11. A folded airbag, which cannot be seen, is arranged inside the housing 40. A gas generator to fill the airbag with expanding gas is likewise arranged on the housing 40. The gas generator is not shown for the sake of clarity.

The housing 40 is placed on the projections 12 which are used as guides, and pressed downward against the resisting force of the springs 20 until the locking elements 41 engage in the recesses 14. The locking elements 41 have undercuts which allow for the displacement of the cover 10 relative to the housing. After the assembly and the maximum compression of the springs 20, they spring back and move the locking elements 41 upward in the drawing, that is, away from the visible side of the cover 10. The recesses 14 form-fittingly fasten the locking projections 41 in the region of the undercut so that the housing 40 cannot be pressed out of the interior of the cover 10. The housing has to be pressed out downward by the distance of the reset path, normally by eight to ten millimeters, for the locking to take place which would result in an accordingly long activation path if a second horn contact is integrally configured at the housing.

Locking holders 46 in the shape of frames can likewise be seen in FIG. 3 that are configured or molded on the housing 40. The working principle of the locking holders 46 will be explained later.

Furthermore, two horn contacts 50 are shown in the described embodiment, which are configured as angular, bent sheet metal parts. Alternative embodiments of the second horn contacts 50 are possible and provided. In the described embodiment, the second horn contacts 50 have longitudinal brackets at the ends that extend downward parallel to the wall 11 of the cover 10 and to the wall of the housing 40 with contact areas 53 protruding perpendicular to them. The contact areas 53 are configured to come into contact with the wire 30 when the cover is displaced against the compression force of the springs 20 in the direction of the housing 40.

Locking elements 60 are further shown, by means of which the second horn contacts 50 can be fastened to the housing 40 via the locking holders 46.

The preliminary assembly of the second horn contacts 50 is shown in FIG. 4. The brackets with the angled contact areas 53 which extend along the wall of the housing are guided through the frame-like locking holders 46. They can additionally be fixed by means of projections or the like. The contact areas 53 are now directly located opposite the wire 30. The locking elements 60 have as yet not been inserted. As can be seen in FIG. 4, the locking elements 60 made of plastic have locking latches 64 which are compressed on insertion of the locking holder 46. After being pushed through, they displace outward and thus form-fittingly lock the locking element at the locking holder 46. In the mounted state, the contact area 53 can be mechanically supported at the front end 65 of the locking element 60 facing the angled contact area 53 when the locking element 60 is completely inserted into the locking holder 46.

The mounted state of the safety device is shown in FIG. 5. The safety device is configured as a ready-to-install module consisting of the cover 10, the springs 20, which are not visible, the first horn contact 30, the housing 40, the second horn contacts 50 and the locking elements 60.

FIG. 6 shows a detailed mounting situation in the area of the contact points between the first horn contact 30 and the second horn contact 50. It is likewise visible that each of the locking elements 41 has an undercut which allows the latches to extend over the upper end of the locking recess 14 in the wall 11 of the cover 10. The locking elements are molded as one-piece on the housing 40. The locking holder 46 is likewise molded as one-piece on the housing 40. It is visible in FIG. 6 that the locking latches 64 abut flush with the bottom side of the locking holders 46 facing the horn contact 30 and thus cause a form fitting locking of the locking element 60 on the one hand, and a form fitting locking of the inserted second horn contact 50 on the other hand. The angled contact surface 53 of the second horn contact 50 abuts against the front end 65 of the locking element 60, so that the locking element 60 forms a mechanical stop and a mechanical support, or a counter bearing for the contact surface 53, so that even repeated actuation of the horn contact by the displacement of the cover 10 does not cause the deformation of the relatively thinly and unstably configured second horn contact 50. An increased functional safety and a light-weight embodiment of the safety device are achieved at the same time by the mechanical fastening and securing by means of the locking element 60. In the described exemplary embodiment, the distance between the wire 30 as the first horn contact and the contact surface 53 is about 2 mm, so that only a short displacement path has to be provided in order to actuate the electrical contact for the circuit to be closed for activating the horn.

While the above description constitutes the preferred embodiment of the present invention, it will be appreciated that the invention is susceptible to modification, variation, and change without departing from the proper scope and fair meaning of the accompanying claims.

The invention claimed is:

1. A safety device having an airbag module which has a housing (40) and which can be mounted in a steering wheel of a motor vehicle, having a cover (10) which is fastened to the housing (40) in a movable manner, on which a first horn contact (30) is arranged, comprising at least a second horn contact (50) is arranged on the housing (40), and in an initial position, the second horn contact is electrically isolated from the first horn contact (30), and in an activation position, the second horn contact comes into electrical contact with the first horn contact (30) in order to trigger a horn signal, the second horn contact (50) is configured as a separate component, which is fixed to the housing (40) by at least one separate locking element (60) having at least has one resilient locking latch (64) which form-fittingly locks the at least one locking element (60) on the housing (40).

2. The safety device according to claim 1, further comprising that the first horn contact (30) is configured as an electrically conductive wire which is fixed to the cover (10).

3. The safety device according to claim 1 further comprising that the housing (40) is made of a plastic material.

4. The safety device according to claim 1 further comprising that the second horn contact (50) is configured as a conductive ribbon or as a conductive strip.

5. The safety device according to claim 1 wherein the locking element (60) is made of a plastic material.

6. The safety device according to claim 1 further comprising that the second horn contact (50) abuts or rests against the front end (65) of the locking element (60) facing the first horn contact (30).

7. The safety device according to claim 1 further comprising that in the initial position, the first horn contact (30) is spaced apart from the second horn contact (50) by not more than 3 mm in the direction of displacement of the cover (10) as it is moved in the movable manner.

8. A safety device having an airbag module which has a housing (40) and which can be mounted in a steering wheel of a motor vehicle, having a cover (10) which is fastened to the housing (40) in a movable manner, on which a first horn contact (30) is arranged, comprising at least a second horn contact (50) is arranged on the housing (40), and in an initial position, the second horn contact is electrically isolated from the first horn contact (30), and in an activation position, the second horn contact comes into electrical contact with the first horn contact (30) in order to trigger a horn signal, the second horn contact (50) is configured as a separate component, which is fixed to the housing (40) by at least one separate locking element (60), wherein locking holders (46) are configured on the housing (40) which hold the locking elements (60) in a form fitting manner.

9. The safety device according to claim 8 further comprising that the second horn contact (50) is guided through the locking holders (46) and is fixed to the housing (40) by the locking element (60) in a form fitting manner.

* * * * *